Sept. 1, 1931.  C. A. MUSGROVE ET AL  1,821,271
AUTOMATIC STABILIZER
Filed April 18, 1930    3 Sheets-Sheet 2
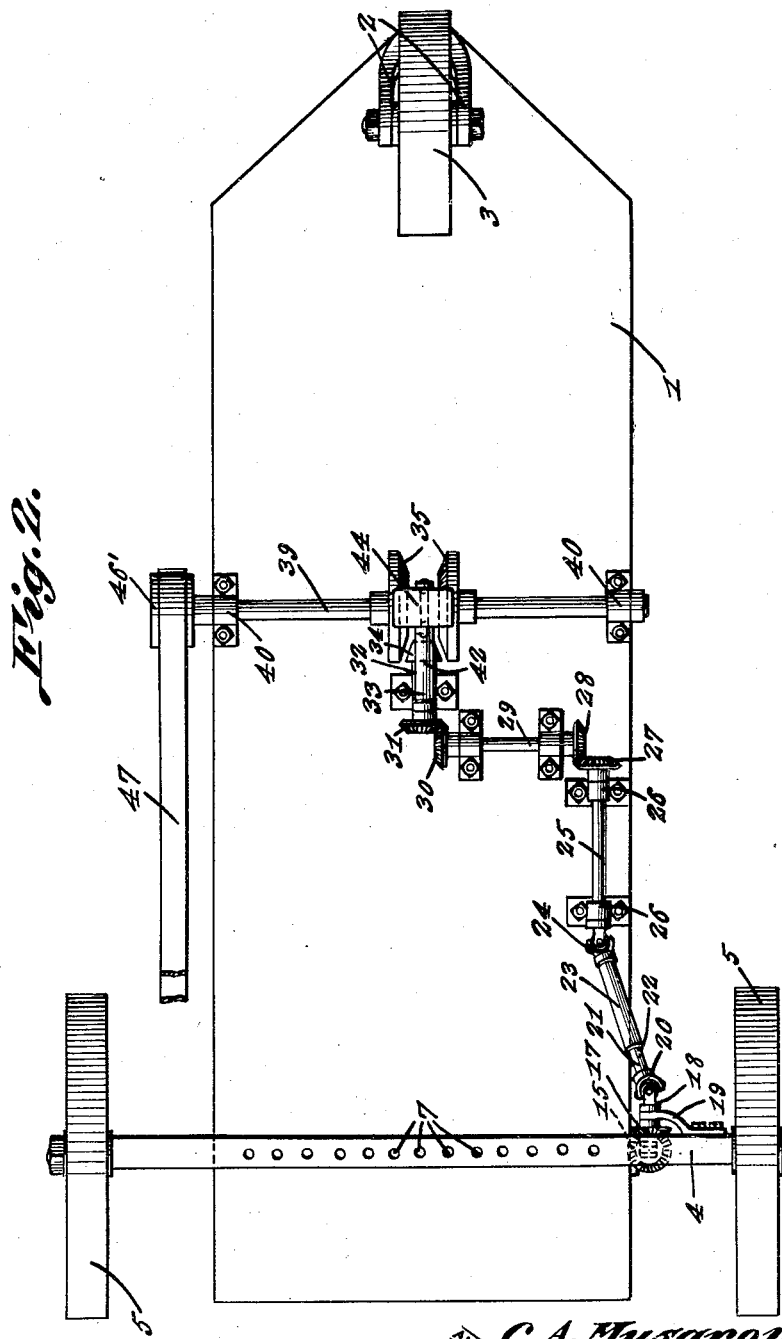

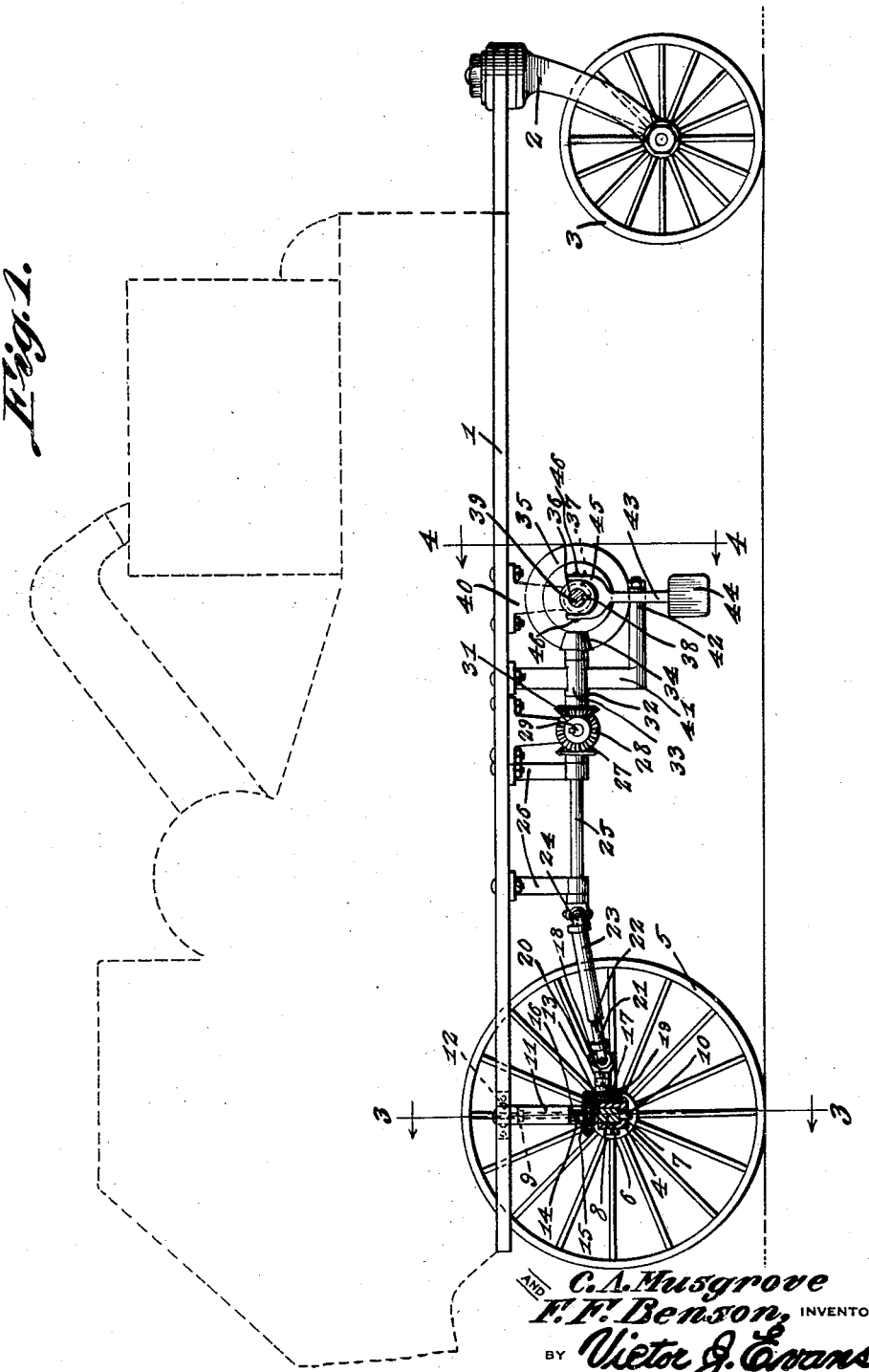

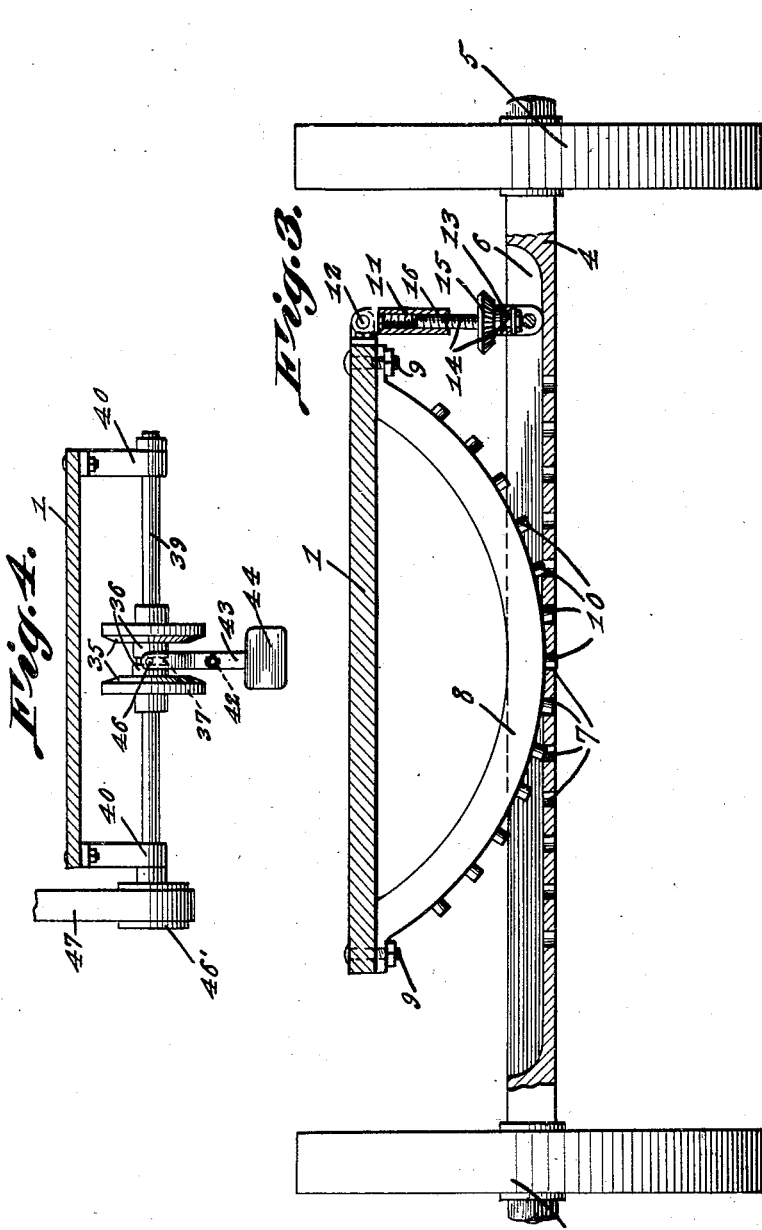

Patented Sept. 1, 1931

1,821,271

UNITED STATES PATENT OFFICE

CHARLES A. MUSGROVE AND FRED F. BENSON, OF CHINOOK, MONTANA

AUTOMATIC STABILIZER

Application filed April 18, 1930. Serial No. 445,434.

This invention relates to a stabilizing mechanism for agricultural and other machines and has as its primary object to provide a mechanism which will maintain the machine which is supported for travel, in a level position notwithstanding the fact that the wheels supporting the machine or the like are travelling over a surface inclined at right angles to the direction of travel of the wheeled supporting structure, so that there will be no liability of overturning of the machine onto the ground surface, the invention therefore contemplating the provision of means which will support a machine or mechanism in stabilized and upright position regardless of the irregularities in the ground surface over which the mechanism is being propelled or drawn.

Another object of the invention is to provide a stabilizing mechanism of the class for the purpose stated which will be entirely automatic in its operation, so that no attention need be paid by the one controlling the travel of the supporting structure as to operation of the stabilizing means.

Another object of the invention is to provide a stabilizing means of the class referred to which will in no way interfere with the transmission of power to the ground wheels of the wheel supported base upon which the agricultural or other machine is supported.

This invention also consists in certain other features of construction and in the combination and arrangement of the several parts, to be hereinafter fully described, illustrated in the accompanying drawings, and specifically pointed out in the appended claim, it being understood of course that minor changes may be made so long as they fall within the scope of the claim.

In describing our invention in detail, reference will be had to the accompanying drawings, wherein like characters denote like or corresponding parts throughout the several views, and in which:—

Figure 1 is a view in side elevation of the mechanism embodying the invention.

Figure 2 is a bottom plan view thereof.

Figure 3 is a vertical transverse sectional view taken on the line 3—3 of Figure 1 looking in the direction indicated by the arrows.

Figure 4 is a similar view taken on the line 4—4 of Figure 1 looking in the direction indicated by the arrows.

The mechanism embodying the invention comprises a supporting base 1 which may constitute a frame structure or a metal or wooden base on which an agricultural machine such as a harvester or any other type of machine may be supported and, at the forward end of the base 1, there is mounted, for swivelling movement a yoke 2 in which is journalled a ground wheel 3. An axle 4 is supported at its ends by ground wheels 5 and this axle is preferably provided with a channel 6 in its upper side and a longitudinal series of openings 7 are formed in the bottom of this channel. The rear portion of the base is supported upon the axle by means of a rocking bolster 8 and preferably comprising an arcuate bar which is bolted or otherwise secured at its ends as at 9 to the under side of the base 1. The lower edge or side of the bolster 8 is provided with a series of radially projecting studs 10 and, as will be observed by reference to Figure 3 of the drawings, these studs are designed to engage in the openings 7 in the rocking movement of the rocker, or more specifically, in the endwise tilting or rocking movement of the axle 4 with respect to the rocker.

In a broad sense, the invention contemplates the utilization of a weighted pendulum unit for automatically effecting such relative movement of the supporting base and axially as to maintain the base in a true horizontal position regardless of the endwise tilting of the axle, and this means will now be described.

As stated above, the bolster 8 is supported for rocking movement upon the axle 4 and it will be observed by reference to Figure 3 that the bolster is received, at its engaging portion in the channel 6 in the axle so that there can be no displacement of the axle and bolster except such as is incident to relative tilting of these parts. The means referred to above comprises an interiorly threaded sleeve 11 which is pivotally suspended at its upper end from a bracket 12 mounted upon the rear side of the base 1 at a point above the axle 4. A bearing 13 is fixed upon the axle near one end of the channel 6 and a shaft 14 is journalled at its lower end in this bearing and fixed upon the shaft is a bevel gear 15 which rests upon the bearing, the shaft, above the bevel gear being threaded as indicated by the numeral 16 and adjustably fitted in the sleeve 11. At this point it will be evident that when rotary motion is imparted to the gear 15 in one direction, the threaded shaft will be threaded into the sleeve 11 resulting in a shortening of the distance between the pivotal mountings for the shaft and sleeve and therefore if the axle 4 has a tendency to tilt downwardly at the left hand end in Figure 3 and the gear 15 is rotated automatically, to effect threading of the shaft into the sleeve 11, the base 1 will remain in its horizontal position although the axle 4 may be tilted downwardly toward the left, and, when the gear 15 is rotated in the opposite direction, the ground surface, at such time being inclined downwardly toward the right, the base 1 will still remain stationary and horizontally positioned notwithstanding the downward tilting of the axle toward the right in Figure 3.

The means employed for effecting automatic rotation of the gear in one direction or the other and to an extent depending entirely upon the degree of inclination of the ground surface comprises a bevel gear 17 which is in mesh with the gear 15 and is fixed upon the shaft 18 mounted in a bearing 19 upon the forward side of the axle 4. A universal joint 20 connects the forward end of this shaft 18 with a shaft 21 comprising telescopic sections 22 and 23, the section 21 being connected by the coupling 20, and the section 23 being connected by another universal joint coupling 24 with one end of a shaft 25 mounted in bearings 26 upon the under side of the base 1. A pivotal gear 27 is fixed upon the forward end of the shaft 25 and meshes with the bevel gear 28 mounted upon the open end of a shaft 29 which is counter to the shaft 25, a bevel gear 30 being mounted upon the other end of the shaft 29 and meshing with a bevel gear 31 fixed upon the rear end of a shaft 32 journalled in a bearing 33 upon the under side of the base 1, and fixed upon the forward end of the shaft 32 is a conical friction gear 34. The conical friction gear 34 is positioned between two bevel, conical friction gears 35 which are connected by a hub 36 having a circumscribing groove 37, these gears being splined as at 38 upon the shaft 39 mounted in bearings 40 upon the said under side of the base 1.

The numeral 41 indicates a bracket which is secured to the under side of the base 1 and extends downwardly and supports the bearing for the shaft 32 and this bracket is provided at its lower end with a forwardly extending arm 42 upon the end of which a lever 43 is pivotally mounted, intermediate its ends. A counter weight 44 is fixedly carried at the lower end of the lever 43 and a yoke 45 is provided at the upper end of the lever and has pins 46 at the ends of its arms to engage in the groove 37 in the hub 36 of the gears 35. The shaft 39 is continuously driven through the medium of a pulley 46' fixed upon one end of the shaft and a belt 47 which is passed about the pulley and about another pulley (not shown) which is motor driven.

From the foregoing description of the invention it will be understood that inasmuch as the shaft 39 is constantly rotated during the travel of the mechanism over the ground surface, the bevel friction gears 35 will be likewise constantly rotated and it will further be evident that so long as the wheels 3 and 5 are travelling over a level surface, or in other words, a surface which is not inclined transversely with respect to the line of travel of the mechanism, the conical frictional gear 34 will be out of engagement with both of the gears 35 and the axle and base will then assume the parallel positions with respect to each other as shown in Figure 3.

However, should the wheels 4 reach a ground surface which is inclined transversely to the line of travel and, for example, to the left in Figures 3 and 4, the weight 44 upon the lever 43, which parts, in effect, constitute a weighted pendulum, the conical friction gear 34 will engage with one of the bevel gears 35 opposite the one toward which the weight 44 is swung with the result that motion will be transmitted through the various shafts and gears above described, to the gear 15 and the shaft 16 would be rotated in a direction to cause the same to fit into the threaded sleeve 11 thus maintaining the base 1 in a horizontal position, regardless of the fact that the axle 4 is tilted downwardly toward the left.

What we claim is:—

An automatic stabilizer including a frame having a ground wheel pivoted to the forward end thereof and a power shaft carried by the frame, an arcuate shaped bolster having the ends thereof secured to the under side of the frame and adjacent the rear end thereof, a channeled rear axle receiving the bolster and having spaced openings, spaced lugs on the bolster and engageable with the openings, wheels for the axle, an internally threaded sleeve pivoted to the frame adjacent one end of the bolster, a bearing secured to the axle, a threaded stem journalled in the bearing and threaded to the sleeve, a shaft journalled to the frame, a stub shaft journalled to the axle, means to rotate the stem by the rotation of the stub shaft, universal and telescopic means between the stub shaft and the second named shaft, a counterbalance control clutch on the power shaft and frame, and means connecting the clutch with the second mentioned shaft.

In testimony whereof we affix our signatures.

CHARLES A. MUSGROVE.
FRED F. BENSON.